Patented Apr. 30, 1940

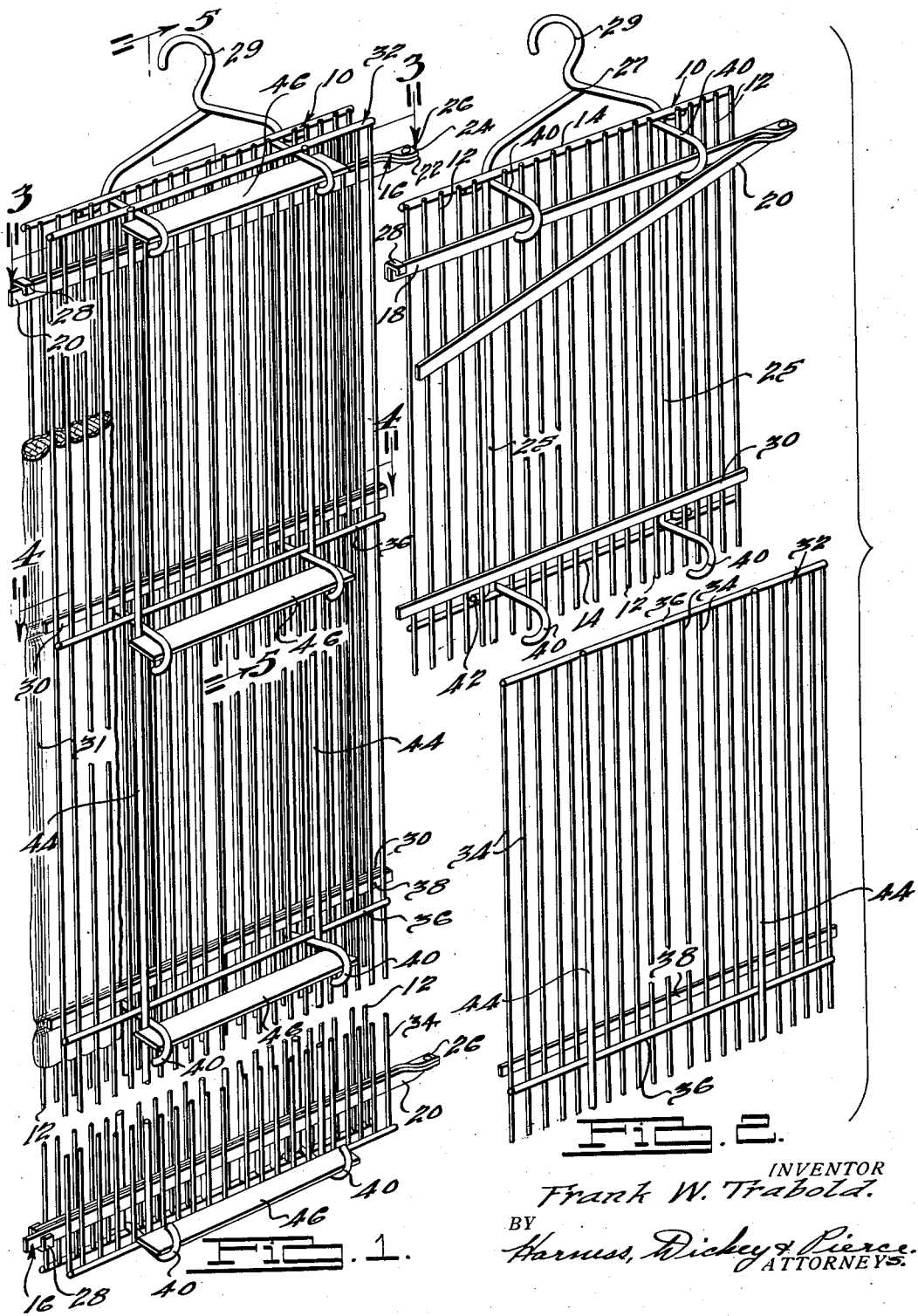

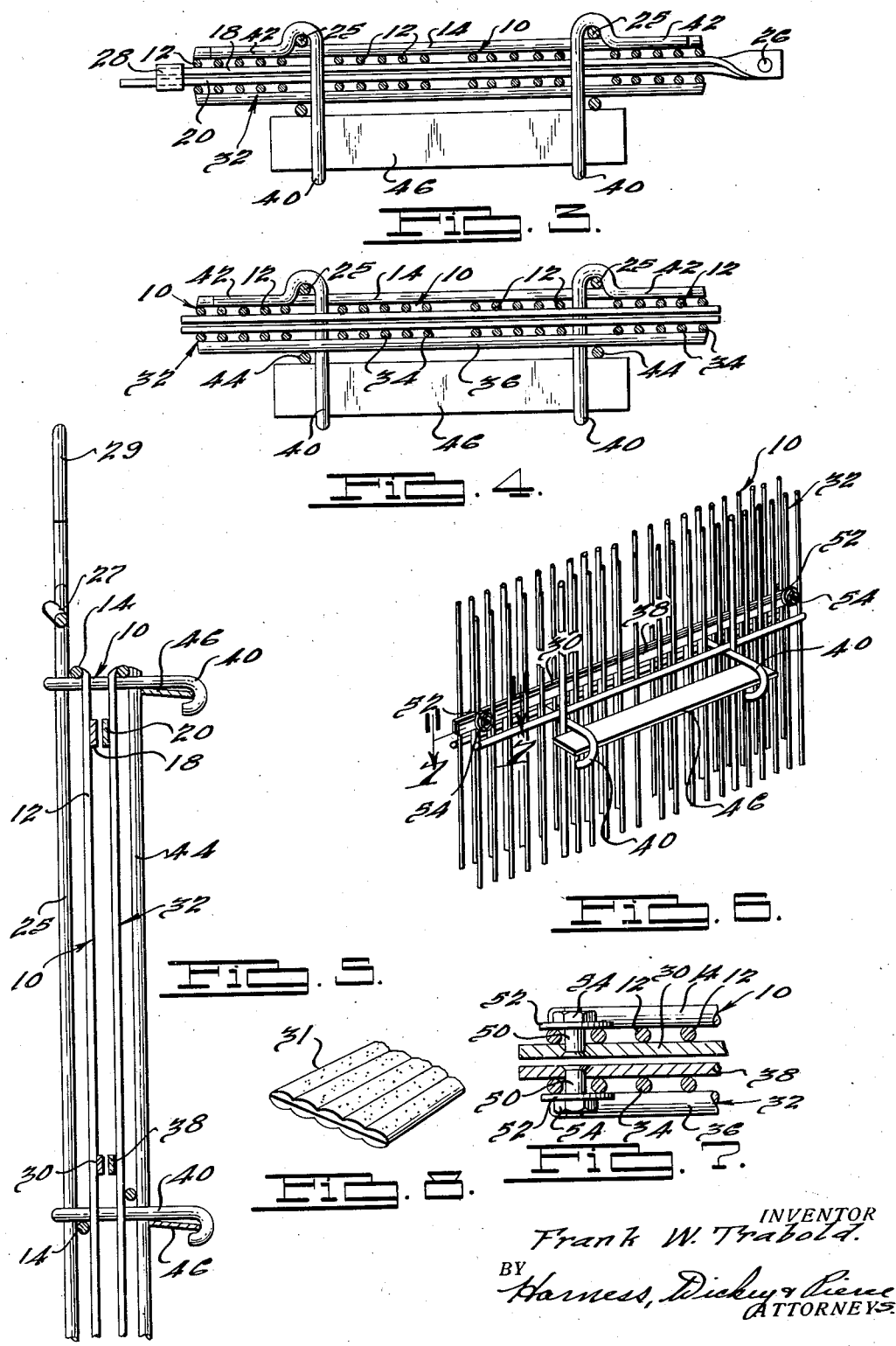

2,199,275

UNITED STATES PATENT OFFICE 2,199,275

FRANKFURTER-FORMING APPARATUS

Frank W. Trabold, Detroit, Mich.

Application October 31, 1938, Serial No. 237,822

5 Claims. (Cl. 17—34)

This invention relates to improved apparatus for use in the formation and treatment of frankfurter sausages and the like.

One of the primary objects of the present invention is to provide an improved apparatus in the form of an open frame construction for deforming frankfurter sausages into flat shape and holding them in such shape during treatment, whereby they take a permanent set.

Another object of the invention is to provide an improved apparatus of the type mentioned within which elongated strips of frankfurter sausages may be placed without the usual linkage steps and within which the strips are deformed and separated into a plurality of individually shaped, flat frankfurters.

Another object of the invention is to provide an improved apparatus of the type mentioned which engages the ends of elongated strips of sausage so that the meat is retained within the casings without the necessity of twisting or tying the ends.

Another object of the invention is to provide a novel means for clamping the ends of an elongated strip of sausage whereby the meat is not displaced from the casing during the deforming operation.

Another object of the invention is to provide an apparatus of the type mentioned by which the usual linkage steps by twisting and tying are eliminated, thereby effecting economies in manufacture and material.

Other objects of the invention will become apparent from the following specification, the drawings relating thereto, and from the claims hereinafter set forth.

In the drawings, in which like numerals are used to designate like parts in the several views throughout:

Figure 1 is a broken perspective view of a grid-like frame construction for deforming elongated strips of sausages into flat individual shape and for holding them in such shape during processing treatment;

Fig. 2 is an enlarged, fragmentary, exploded perspective view of the upper portion of the structure shown in Fig. 1;

Fig. 3 is an enlarged cross-sectional view with parts in elevation taken substantially along the line 3—3 of Fig. 1;

Fig. 4 is an enlarged cross-sectional view with parts in elevation taken substantially along the line 4—4 of Fig. 1;

Fig. 5 is an enlarged cross-sectional view with parts in elevation taken substantially along the line 5—5 of Fig. 1;

Fig. 6 is a fragmentary, perspective view illustrating a modified form of the present invention;

Fig. 7 is an enlarged cross-sectional view with parts in elevation taken substantially along the line 7—7 of Fig. 6; and Fig. 8 is a fragmentary, perspective view of a flat frankfurter sausage produced with the structures of the present invention.

The present invention relates to improvements over the type of framework disclosed in the co-pending application of Frank W. Trabold, Serial No. 183,867, filed January 7, 1938. The framework disclosed in the present application is adapted to deform frankfurter sausages into a flat shape and to hold the sausages in such shape during the processing steps described in the co-pending application referred to in order to impart a permanent set to the sausages. Reference may be had to the co-pending application referred to for a more complete description of the processing steps to which the frankfurters are subjected; but for an understanding of the present invention it is merely necessary to understand that the strips of elongated sausage are deformed to the flat shape desired and then subject to smoking and cooking processing steps, whereby the sausages take on a permanent set in their flat shapes. The individual sausages may thereafter be subjected to additional cooking and do not become distorted during such cooking.

According to the present invention, a framework is provided in which a plurality of elongated strips of sausage are disposed within the frame and deformed. The strips of sausage referred to are in the form of packed sausage meat enclosed within elastic casings. These strips are originally substantially circular in cross-section and may be cut into the desired lengths as they issue from the forming machines. When using frames according to the present invention, it is not necessary to link the strips, that is twist and tie the casing at spaced points therealong; but the strips may be disposed directly within the frame. Clamping means are provided which engage and clamp the open ends of the strips so that the meat is not forced out of the ends of the casing during the deforming step. Partition members are also provided on the frame member which serve to divide the elongated strips into a plurality of individual sausages which are generally flat in shape.

For a better understanding of the invention, reference may be had to the accompanying drawings and particularly to Figs. 1 to 5 thereof, in which one embodiment of the present invention is illustrated. A grid-like frame, generally indicated at 10, is provided which includes a plurality of longitudinally extending, transversely spaced rod or wire members 12. A plurality of other rod or wire members 14, preferably of slightly greater gauge than the wire members 12, extend transversely of the members 12 at spaced intervals longitudinally thereof, and are fixed to the surfaces of the members 12 so that the inner surfaces thereof are free from obstruction and lie in substantially the same plane. The members 12 are preferably arranged in groups across the frame member 10, and in the embodiment illustrated, each group includes five rod members 12 with slightly greater spaces between the groups than between the individual rod members and there being four of such groups. Each group represents a transverse portion of the frame member, with each portion extending the length of the frame member; and each of such portions is adapted to receive thereon an elongated strip of frankfurter sausage.

A clamping means, generally indicated at 16, is disposed adjacent each end of the frame member 10, which is adapted to engage and clamp the ends of the sausage strips so that the ends of the strips are clamped closed, and the meat contained within the casing will not be forced out through the ends during the deforming operation. The clamping means 16 include a transversely extending flat member 18 which is welded to the inner faces of the members 12 and extends slightly beyond each side of the frame 10. Another flat member 20 is twisted at its end 22 and is pivotally mounted to complementary twisted end 24 of the member 18 by a pivot pin 26. The member 20 may thus be clamped against the member 18 and is adapted to be received under a hook member 28, which is fixed to the opposite end of the member 18.

Transversely extending partitioning members 30 in the form of flat strips are fixed to the inner faces of the members 12 at spaced intervals longitudinally of the frame 10. These strips 30 may be welded or otherwise suitably secured to the rod members 12.

As the frankfurter sausage issues from the forming machine, in which the meat is packed within an elastic casing, it may be cut into lengths which are substantially equal to the distance between the two severing means 16 of the frame 10. These strips, as shown at 31, do not need to be linked, nor do they need to have their ends closed, but may be placed on the frame member 10, side by side, one on each of the above mentioned groups of rod members 12. By closing the bars 20 and hooking the ends of the bars under the hooks 28, the ends of the sausage strips are clamped together so that the meat may not be forced therefrom. The members 30 underlie the strips of sausage, and are so spaced from each other as to predetermine the length of the final frankfurter sections.

Longitudinally extending wire or rod members 25 are welded to the outer surfaces of the transverse members 14 and are bent inwardly and joined together, as indicated at 27. The outer end of one of these members is then bent into the form of a hook 29 by which the assembled framework may be suspended in a smoke oven or cooking oven.

Another grid-like frame, generally indicated at 32, is provided and includes a plurality of longitudinally extending, transversely spaced rod or wire members 34, similar to the members 12. These rod members 34 are grouped in the same manner as the rod members 12, above described. A plurality of other rod or wire members 36, corresponding to the wire members 14, extend transversely of the members 34 at spaced intervals longitudinally thereof, and are welded thereto.

A plurality of partitioning members 38, similar to the partitioning members 30, are welded to the innner faces of the members 34 at positions on the frame member 32 corresponding to the positions of the members 30 on the frame member 10. The members 38 are adapted to overlie the partitioning members 30 when the two frame members are assembled so as to partition or separate the strip 31 of sausage into individual frankfurters in a manner which will become more apparent from the complete description.

The frame member 32 is disposed over the frame member 10, so that the partitioning members 30 and 38 overlie each other, and these frame members are then resiliently clamped together so as to exert substantial pressure against the strips of sausage 31. The means for clamping the two frame members together include a plurality of hook members 40 having laterally disposed hooked ends 42, which hook under the rod members 25 and are welded to these rod members and to the transversely extending members 14.

The hooks 40 are adapted to extend through the spaces between the rod or wire members 34 beyond the outer face of the frame member 32 in positions under the transverse members 36, which bear against the hooks.

Longitudinally extending rod or wire members 44 are disposed on the outer faces of the frame member 32 and are welded to the transversely extending members 36. Removable plate members 46 are adapted to be hooked under the hooks 40 and extend transversely of the frame members so that one edge of the members 46 engages under the hooks and the other edge thereof bears against the members 44. By placing one edge of the members 46 under the hooks 40, the plate members 46 are first slanted, and then by straightening these plate members up, the opposite edge thereof slides along the members 44 and urges the frame member 32 toward the frame member 10, thereby distorting the sausage strip 31 into a flat form, as indicated in Fig. 1, and also as indicated in Fig. 8.

The hooks 40 are preferably positioned closely adjacent to the partitioning members 30 and 38, so that the pressure is most directly applied at these points in order that the strips of sausage be partitioned into individual sections. Although the casing is not severed by this pressure, the meat within the casing is separated into individual frankfurters which are separated when the casing is removed.

In Figs. 6 and 7, a modified form of the present invention is illustrated in which the partitioning members 30 and 38 are not permanently fixed to the rod members 12 and 34, as in the embodiment described above, but are removably attached thereto so that they may be slidably adjusted along the length of the frame to thereby vary the length of the individual frankfurter. Each of the partitioning members 30 and 38 is provided with outwardly disposed bolts 50 at each end thereof which are adapted to extend through the space between adjacent rod members 12 or 34. Washers 52 are then disposed over the ends of the bolts 50 which bear against the adjacent rod members and are fixed in position by means of nuts 54. It is evident that with this mounting means the partitioning members 30 and 38 may be removed or may be loosened so that they may be slid longitudinally of the rod members. A suitable number of such partitioning members may be provided at suitable spaces along the frame members so that frankfurters of various lengths may be produced.

Formal changes may be made in the specific embodiments of the invention described without departing from the spirit and substance of the invention, the scope of which is commensurate with the appended claims.

What is claimed is:

1. An apparatus for processing frankfurter sausages and the like, comprising an openwork frame member adapted to receive an elongated strip of frankfurter sausage, said frame member including a plurality of longitudinally extending, transversely spaced rod members, said rod members being substantially parallel to each other and forming a longitudinally extending support for said strip throughout the length of said frame, a plurality of transversely extending partition members fixed to said rod members at spaced intervals therealong, a cooperating openwork frame member adapted to overlie said first named frame member against said strip, said cooperating frame member including a plurality of longitudinally extending, transversely spaced rod members so arranged as to overlie complementary rod members on said first-named frame member, and clamping means engaging said frame members and urging them together to deform said strip into a plurality of individual flat frankfurter sausages.

2. An apparatus for processing frankfurter sausages and the like, comprising an openwork frame member adapted to receive an elongated strip of frankfurter sausage thereon, said frame member including a plurality of longitudinally extending, transversely spaced partition members, clamping means mounted on said frame member and disposed adjacent the ends thereof and adapted to clamp the ends of said strip, a plurality of transversely extending partition members on said rod members at spaced intervals therealong, a cooperating openwork frame member adapted to overlie said first named frame member against said strip, said cooperating frame member including a plurality of longitudinally extending, transversely spaced rod members so arranged as to overlie complementary rod members on said first-named frame member, and clamping means engaging said frame members and urging them together to deform said strip into a plurality of individual flat frankfurter sausages.

3. An apparatus for processing frankfurter sausages and the like, comprising an openwork frame member adapted to receive a plurality of elongated strips of frankfurter sausage arranged side by side, said frame member including a plurality of longitudinally extending, transversely spaced rod members forming a longitudinally extending support for said strip throughout the length of said frame, transversely extending clamping members disposed adjacent each end of said frame, one of said members at each end of said frame being fixed directly to said frame and another of said members being pivotally connected to one end of said one of said members and extending in overlying relation thereto with its other end releasably clamped to the other end of said one of said members to clamp the ends of said strip together, a plurality of transversely extending partition members fixed to said rod members at spaced intervals therealong, a cooperating openwork frame member adapted to overlie said first named frame member against said strip, said cooperating frame member including a plurality of longitudinally extending rod members, hook members fixed to one of said frame members and extending through and beyond the other frame member, and releasable clamping means engaging under said hook members and against said other frame member to urge said frame members together to thereby deform said strip into a plurality of individual flat frankfurter sausages.

4. An apparatus for processing frankfurter sausages and the like, comprising an openwork frame member adapted to receive elongated strips of frankfurter sausage therebetween, said frame member including a plurality of longitudinally extending, transversely spaced rod members, a plurality of transversely extending partition members on said rod members at spaced intervals therealong, a cooperating openwork frame member adapted to overlie said first named frame member against said strip, said cooperating frame member including a plurality of longitudinally extending, transversely spaced rod members, hook members fixed to one of said frame members adjacent said partition members and extending through the spaces between the rods on the other frame member, and elongated transversely extending clamping members engaging under said hook members and bearing against said other frame member, to thereby urge said frame members together to deform said strip into a plurality of individual flat frankfurter sausages.

5. An apparatus for processing frankfurter sausages and the like, comprising an openwork frame member adapted to receive elongated strips of frankfurter sausage, a plurality of transversely extending partition members on said frame member at spaced intervals therealong, a cooperating openwork frame member adapted to overlie said first named frame member against said strip, a plurality of transversely extending partition members on said cooperating frame member at spaced intervals therealong, corresponding to the position of said first named partition members, hook members fixed to one of said frame members adajacent said partition members and extending through the spaces between the rods on the other frame member, and elongated transversely extending clamping members engaging under said hook members and bearing against said other frame member, to thereby urge said frame members together to deform said strip into a plurality of individual flat frankfurter sausages.

FRANK W. TRABOLD.